United States Patent
Beatty et al.

(10) Patent No.: US 8,760,797 B1
(45) Date of Patent: Jun. 24, 2014

(54) CONTAMINATION CONTROL FOR A DISC DRIVE

(71) Applicant: Seagate Technology LLC, Cupertino, CA (US)

(72) Inventors: Paul Allison Beatty, Fort Collins, CO (US); David R. Lapp, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/917,326

(22) Filed: Jun. 13, 2013

(51) Int. Cl.
 *G11B 17/03* (2006.01)
 *G11B 33/08* (2006.01)

(52) U.S. Cl.
 USPC .................................. 360/97.12; 360/99.15

(58) Field of Classification Search
 USPC .......... 360/97.01, 97.02, 97.12, 97.18, 97.15, 360/97.19, 99.16, 99.17, 99.18, 99.24; 96/4, 13, 14
 See application file for complete search history.

(56) References Cited

U.S. PATENT DOCUMENTS

| | | | |
|---|---|---|---|
| 4,275,835 A | 6/1981 | Miksic et al. | |
| 5,536,302 A | 7/1996 | Golden et al. | |
| 6,683,747 B2 | 1/2004 | Bernett | |
| 6,892,567 B1 | 5/2005 | Morrow | |
| 7,075,037 B2 | 7/2006 | Shimizu et al. | |
| 7,095,584 B2 * | 8/2006 | Logan | 360/97.18 |
| 7,166,142 B2 | 1/2007 | Tuma et al. | |
| 7,323,661 B2 | 1/2008 | Shimizu | |
| 7,365,937 B2 | 4/2008 | Gunderson | |
| 7,538,972 B2 | 5/2009 | Burts-Cooper et al. | |
| 7,629,557 B2 | 12/2009 | Shimizu | |
| 7,639,449 B1 * | 12/2009 | Kose et al. | 360/97.12 |
| 7,746,537 B2 | 6/2010 | Natarajan et al. | |
| 7,815,127 B2 | 10/2010 | Beatty et al. | |
| 8,124,434 B2 | 2/2012 | Gally et al. | |
| 8,131,376 B1 | 3/2012 | Faraji et al. | |
| 8,236,452 B2 | 8/2012 | Zhamu et al. | |
| 8,375,994 B2 | 2/2013 | Olszewski | |
| 8,391,987 B2 | 3/2013 | Faraji et al. | |
| 8,404,388 B2 | 3/2013 | Visco et al. | |
| 2009/0201606 A1 | 8/2009 | Burts-Cooper et al. | |

\* cited by examiner

*Primary Examiner* — Nabil Hindi
(74) *Attorney, Agent, or Firm* — Crawford Maunu PLLC

(57) ABSTRACT

Various aspects of the present disclosure are directed toward a disc drive apparatus having an inner enclosure structure that resides within an outer disc drive enclosure. The inner enclosure structure includes an environment-adsorption material, an inner volume of gas, and an aperture-defining membrane. The environment-adsorption material combines a first-type of molecules with a second-type of molecules that are present in the outer disc drive enclosure. Additionally, the aperture-defining membrane facilitates diffusion of the second-type of molecules into the inner enclosure structure and into contact with the environment-adsorption material to adsorb the second-type of molecules into the first-type of molecules, which reduces the volumetric pressure in the outer disc drive enclosure.

20 Claims, 4 Drawing Sheets

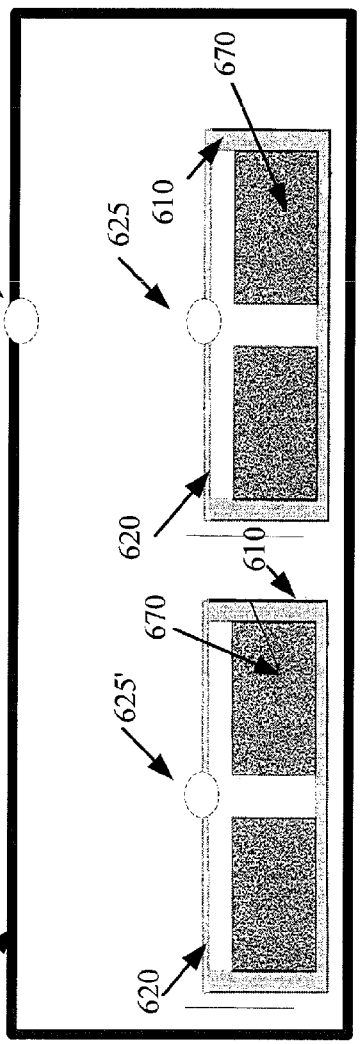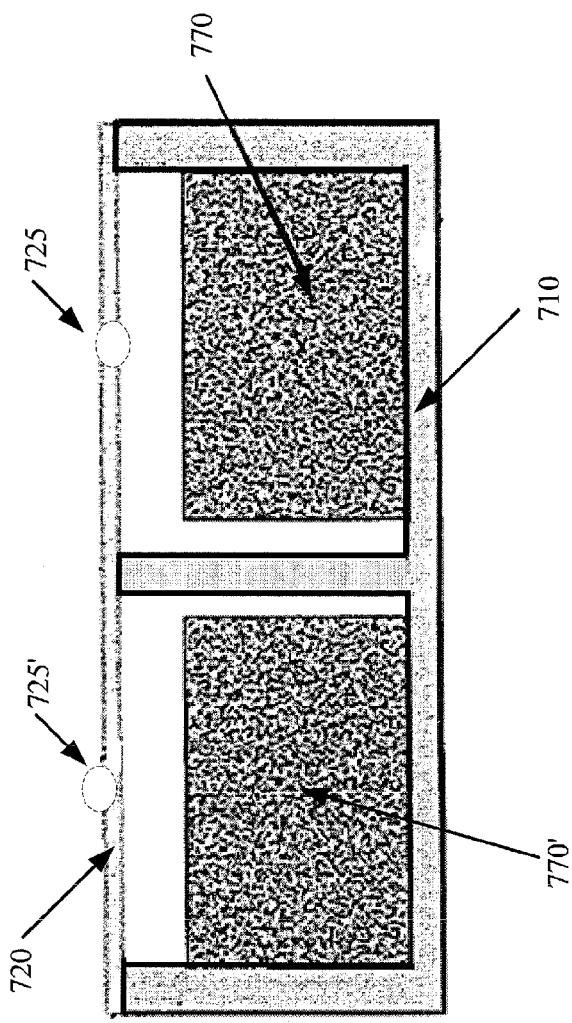

CONTAMINATION CONTROL FOR A DISC DRIVE

FIELD

Aspects of various embodiments of the present disclosure are directed to removing unwanted molecules from an enclosed storage device such as hard disc drives.

BACKGROUND

Disc drives are used for data storage in modern electronic products ranging from digital cameras to computer systems and networks. A disc drive typically includes a mechanical portion, or head disc assembly (HDA), and electronics in the form of a printed circuit board assembly (PCBA), mounted to an outer surface of the HDA. The PCBA controls HDA functions and provides an interface between the disc drive and its host. An HDA includes moving parts such as one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly. In operation, the magnetic-recording disc rapidly rotates by the spindle motor to access (read and/or write) the data stored on the disc.

A disc drive unit typically includes a housing that protects the workings of the drive from particulates and other environment-related contaminants. Control of the internal relative humidity (RH) within the housing of the disc drive is desirable since the moisture content of the surrounding air affects the performance and reliability of the head/disc interface (HDI), which is an important parts of the disc drive recording system. For example, it is known that head-to-disc stiction and media corrosion are aggravated by high relative humidity levels. As a further example, excessive disc wear has been observed under conditions of very low relative humidity.

Many commercial hard disc drive products incorporate various elements, such as salts in the form of potassium carbonate/bicarbonate, activated carbon, and other elements to adsorb moisture and volatile organic vapor contaminates (second-type of molecules) within a drive. The adsorption helps to moderate relative humidity levels within the drive. Additionally, desiccants, such as silica gel may be included for further moderation of relative humidity inside the drive. The beneficial effects to such disc drive products are, however, limited to the longevity of the elements used to offset the effect of the environment-related contaminants.

These and other matters have presented challenges to humidity and other molecule removal within an enclosure for a variety of applications.

SUMMARY

Various example embodiments are directed to maintaining low humidity and oxygen levels, as well as other molecules within a disc drive enclosure.

According to the present disclosure, certain embodiments are directed toward a disc drive apparatus including an inner enclosure structure that is positioned within an outer enclosure. Contained in the inner enclosure structure is an environment-adsorption material. The environment-adsorption material combines a first-type of molecules, within the environment-adsorption material, with a second-type of molecules that are present in the outer enclosure. Also within the inner enclosure structure is an inner volume of gas that surrounds the environment-adsorption material. The inner volume of gas has a volumetric pressure less than a volumetric pressure contained in the outer enclosure. The inner enclosure structure is also provided with an aperture-defining membrane that facilitates a diffusion of the second-type of molecules into the inner enclosure structure and into contact with the environment-adsorption material. In this manner, the second-type of molecules is adsorbed into the first-type of molecules, which reduces the volumetric pressure in the outer enclosure.

More specific embodiments are directed to controlling the interaction of the gases between the inner enclosure and the outer disc drive enclosure. In one such specific embodiment, the aperture-defining membrane is marked to identify a region through which an aperture is provided, and the outer enclosure within which the inner enclosure structure is located and within which an ambient gas is contained outside of the inner enclosure structure. In another specific embodiment, the outer disc drive enclosure is a housing that contains an electromagnetic disc, a head-actuation assembly, and a motor such as a spindle motor. The head-actuation assembly and the motor are configured and arranged to read and write data on the electromagnetic disc. The aperture-defining membrane operates in combination with the environment-adsorption material to reduce turbulence and drag related to the head-actuation assembly and the motor, thereby increasing heat-transfer in the disc drive apparatus and facilitating environmental protection of the (electromagnetic) disc. This also lessens adverse impact due to the second-type of molecules on the disc, the head-actuation assembly and the motor.

In another specific embodiment in which the outer enclosure contains an electromagnetic disc, a head-actuation assembly and motor, the outer disc drive enclosure is configured and arranged for containing an ambient light-weight gas, such as helium, and the aperture-defining membrane is marked to identify a region through which an aperture is to be provided. This would typically occur when the apparatus would be put into use such as just before installation or as the apparatus is being removed from another otherwise environment-safe storage location. With the aperture providing a pass-through while the apparatus would be put into use, the aperture permits the environment-adsorption material to adsorb heavier molecules such as those in humidity, to reduce turbulence and drag related to the head-actuation assembly and the motor.

Various aspects of the present disclosure are also directed toward methods of manufacturing and using disc drive apparatuses such as described above. For example, various methods provide the inner enclosure structure with an inner volume of gas with a volumetric pressure less than a volumetric pressure contained in the outer enclosure. For the inner enclosure, the aperture-defining membrane is marked to identify an aperture region through which an aperture is to be provided, and the inner enclosure is then contained in the outer enclosure such that the aperture region of the inner enclosure is aligned with an access port provided in the outer enclosure. When the disc drive apparatus is put into use such as during installation in the field or at the time of shipment before installation, field/service personnel insert an elongated puncture tool (probe, screwdriver, etc.) through the access port to reach the aligned aperture region of the inner enclosure and, with no need to disassemble the outer enclosure, then puncture the aperture region to enable gas flow/dispersion of molecules from the outer enclosure towards to the environment-adsorption material.

The above discussion/summary is not intended to describe each embodiment or every implementation of the present

DESCRIPTION OF THE FIGURES

Various example embodiments may be more completely understood in consideration of the following detailed description in connection with the accompanying drawings, in which:

FIG. 6 is a cross-sectional side view illustrating an inner enclosure structure within an outer enclosure, consistent with various aspects of the present disclosure; and FIG. 7 is a cross-sectional side view illustrating an inner enclosure structure, consistent with various aspects of the present disclosure.

Figure 1:
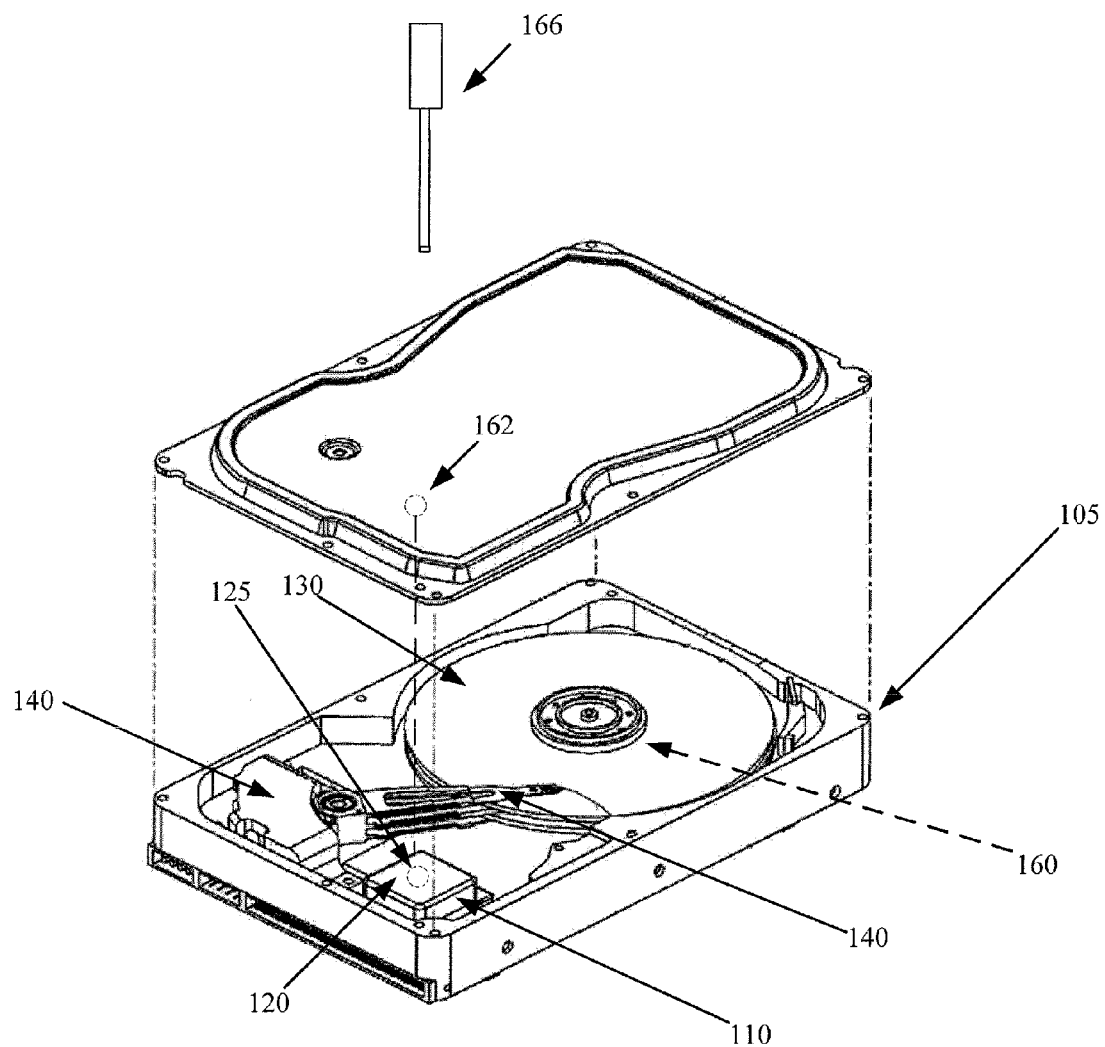
FIG. 1 is a partial exploded perspective view illustrating a disc drive with an inner enclosure structure, consistent with various aspects of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements involving long-term use of enclosed storage devices. Specific embodiments of the present disclosure are believed to be particularly beneficial to disc drive apparatus including complex moving/mechanisms such as spindle motors and HDAs as described above. While the present disclosure is not necessarily so limited, various aspects of the disclosure may be appreciated through a discussion of examples using this context. Various example embodiments are directed to maintaining low humidity and oxygen levels, as well as other molecules (e.g., volatile organic vapor contaminants) within an enclosure and their implementation.

Various aspects of the present disclosure are directed toward an apparatus which includes an inner enclosure structure that resides within an outer disc drive enclosure. The inner enclosure structure includes an environment-adsorption material, an inner volume of gas, and an aperture-defining membrane. The environment-adsorption material combines a first-type of molecules, contained within the environmental-adsorption material, with a second-type of molecules (e.g., oxygen, water, volatile organic vapor contaminants, and combinations thereof) that are present in the outer enclosure. The combination of the first-type of molecules with the second-type of molecules may include adsorption, physical absorption, and/or chemical absorption, among other molecule capturing methods. The inner volume of gas, also within the inner enclosure structure, surrounds the environment-adsorption material and has a volumetric pressure less than a volumetric pressure contained in the outer enclosure. The reduced volumetric pressure within the inner enclosure structure is at least partially due to the environment-adsorption material adsorbing the second-type of molecules. The second-type of molecules in the inner enclosure structure, if otherwise unaffected, would account for a partial pressure of the inner enclosure environment. The absence of a portion of the second-type of molecules, due to adsorption onto the environment-adsorption material, otherwise present in the inner enclosure structure creates a pressure differential between the inner and outer enclosure structures. Further, the aperture-defining membrane, within the inner enclosure structure, facilitates diffusion of the second-type of molecules into the inner enclosure structure and into contact with the environment-adsorption material to adsorb the second-type of molecules into the first-type of molecules. This reduces the volumetric pressure in the outer enclosure.

In certain embodiments, the outer enclosure also includes a disc drive, a head-actuation assembly, and motor. The head-actuation assembly and the motor read and write data on the disc drive. In such embodiments, the aperture-defining membrane is marked to identify a region through which an aperture is provided, and the outer enclosure is designed for containing an ambient gas and the inner enclosure structure. Additionally, in other embodiments, the aperture-defining membrane reduces turbulence and drag related to the head-actuation assembly and the motor, increasing heat-transfer in a disc drive. This facilitates environmental protection of the head-actuation assembly and the motor, and lessens impact due to the second-type of molecules on, an electromagnetic disc, the head-actuation assembly and the motor. In more specific embodiments, the aperture-defining membrane is marked to identify an aperture region through which an aperture is to be provided, and the inner enclosure is then contained in the outer enclosure such that the aperture region of the inner enclosure is aligned with an access port provided in the outer enclosure.

The marking of the aperture-defining membrane can be provided in different ways. For example, the marking can be provided directly such as by printing a circle or "x" on the membrane as the area to be punctured. The marking can also be provided, as an alternative or in addition to the direct marking, by an indirect method in which the region is identified once the inner enclosure is within the outer enclosure and by the alignment of the region with the above-noted access port of the outer enclosure. In this configuration, any (optional) marking on the membrane can be visually recognizable through, or hidden by, the outer enclosure, depending on the specific design of the access port. Once the puncture occurs, the access port can be resealed.

In certain embodiments, a lighter and chemically inert gas (e.g., helium) or vacuum is provided in the outer enclosure before or after the access port is breached for puncturing of the membrane. For these embodiments, the access port is quickly resealed. Optionally, another lighter gas insertion or vacuum step can be performed through the access port or another port of the outer enclosure after the membrane puncture, for establishing or reestablishing a less adverse environment in the outer enclosure and thereby facilitating the beneficial long-term effect of the environment-adsorption material through the aperture. For specific implementations, this latter step is performed when the disc drive apparatus is put into use such as during installation in the field or at the time of shipment before installation. Field/service personnel insert an elongated puncture tool, such as a probe or screwdriver, through the access port to reach the aligned aperture region of the inner enclosure. In this manner, the aperture region can be punctured to enable gas flow/dispersion of molecules from the outer enclosure towards the environment-adsorption material with no need to disassemble the outer enclosure.

Certain embodiments of the present disclosure are further characterized in that the aperture-defining membrane is marked to identify a region through which an aperture is provided. In these embodiments, the outer enclosure also includes a disc, a head-actuation assembly and motor. The head-actuation assembly and the motor read and write data on the disc drive. Additionally, in such embodiments, the outer enclosure contains an ambient gas, and also contains the inner enclosure structure. The aperture can be punctured in order to facilitate the diffusion of the second-type of molecules into the inner enclosure structure and into contact with the environment-adsorption material (which contains the first-type of molecules). In this manner, the first-type of molecules in the environment-adsorption material adsorb the second-type of molecules. Further, this reduction of the second-type of molecules reduces turbulence and drag related to the head-actuation assembly and the motor within the disc drive. This increases heat-transfer caused by the moving elements and electronic components of the disc drive, and facilitates environmental protection of the second-type of molecules on the disc, the head-actuation assembly and the motor of the disc drive. Additionally, the reduction of the second-type of molecules also lessens the physical impact of the second-type of molecules on the disc, the head-actuation assembly and the motor of the disc drive. In certain embodiments, these aspects allow for high performance read/write throughput of the disc drive in terms of inputs-outputs-per-second (IOPS), decreased read/write errors and greater longevity of the mechanical components due to decreased corrosion.

In certain embodiments, the aperture-defining membrane facilitates communication and combination of the first-type of molecules with the second-type of molecules commensurate with a minimum time period during which the first-type of molecules of the environment-adsorption material interact through dispersion via a puncture through the aperture-defining membrane. The environment-adsorption material, in certain embodiments, provides adsorption capability commensurate with the length of designed lifetime of a disc drive (e.g., a usable lifetime that reaches to about and in some instance over half a decade) to facilitate environmental protection of the enclosure.

Additionally, in certain embodiments, the inner enclosure structure has two separate compartments, both of which utilize the aperture-defining membrane. In such embodiments, both compartments contain environment-adsorption material and may be punctured, via the aperture-defining membrane, independently of one another. In certain embodiments of the present disclosure, the environment-adsorption material is encased in polytetrafluoroethylene (PTFE). The PTFE casing can prevent the environment-adsorption material from entering the outer enclosure and causing damage to elements of the head-actuation assembly and other moving parts within the disc drive. Other materials useful for facilitating this adsorption include bicarbonates and polymers such as polyacrylic acid (PAA) or polyacrylamide (PAM). Additionally, the environment-adsorption material can be a desiccant, activated carbon, chemical getters, chemical acid buffers, and combinations thereof.

Certain embodiments of the aperture-defining membrane operate as a tamper-indicator to verify that the membrane is only punctured after the aperture-defining membrane is in use (e.g., post-sale or post-shipment). The condition of the membrane may be verified by visual inspection or other means. The condition of the membrane may also be detected by sensor means. One such sensor would measure the curvature of the aperture-defining membrane using light, a physical probe, or other means to determine if the inner enclosure is still under seal. In other embodiments, inspection would determine displacement of the membrane from a pressure-neutral (un-deformed state) reference position. The displacement, in the present embodiment, may be detected by an electrical capacitance gauge, visual inspection, mechanical probe, among other means. The visual inspection method may include using a reference film stretched flat across the top of the membrane, thereby, if the inner enclosure was no longer under seal, no gap between the membrane and the reference film would be present.

Additionally, the aperture-defining membrane, in certain embodiments, is punctured by a remote automated process post-assembly. The automated process may include the use of a micro-electro-mechanical-system (MEMS). In these instances, the MEMS system will receive an electronic signal, via an integrated circuit based on a programmable triggering condition(s), to cause the puncture of the membrane resulting in an aperture. In another remote automated puncture process, the puncture of the membrane may be achieved post-assembly utilizing an actuator, which is similarly controlled by an integrated circuit.

The aperture-defining membrane, in certain embodiments, indicates post-factory service intervals as indicated by the membrane being punctured. For example, the terms of the warranty agreement for a disc drive may require that the purchaser maintain the disc drive by puncturing a plurality of membranes on the inner enclosure structure at determined intervals to maintain the proper outer enclosure environmental conditions. As the environment-adsorption material typically is limited to the amount of second-type of molecules it may adsorb, the usable life of the drive may be extended by the user puncturing another membrane of the inner enclosure structure. The newly punctured membrane allows for the diffusion and adsorption of more of the second-type of molecules with a first-type of molecules within the unsaturated environment-adsorption material. The aperture-defining membrane, according to other embodiments, includes a mark on an exterior side of the aperture-defining membrane. The mark indicates a location at which the membrane may be punctured.

Various aspects of the present disclosure are more specifically directed towards methods of use and/or manufacture. The methods are characterized in that an outer enclosure is provided, and an inner enclosure structure is mounted within the outer enclosure. Additionally, a second-type of molecules is diffused into the inner enclosure structure and into contact with the environment-adsorption material (which contains a first-type of molecules). The inner enclosure structure contains an inner volume of gas surrounding an environment-adsorption material with a volumetric pressure less than a volumetric pressure contained in the outer enclosure. The second-type of molecules is adsorbed into the first-type of molecules, which reduces the volumetric pressure in the outer enclosure. Diffusion and adsorption of the second-type of molecules can occur repetitively over a time period, which is defined as a function of an adsorption ability of the environment-adsorption material.

In certain embodiments, the aperture of the aperture-defining membrane is punctured in order to facilitate diffusing and adsorbing of the second-type of molecules. Further, the outer enclosure, prior to puncturing the membrane, has a higher volumetric pressure compared to the pressure of the inner enclosure structure. Thus, puncturing of the membrane, results in second-type of molecules diffusing into the inner enclosure structure, and adsorption of the second-type molecules by the first-type molecules within the environment-adsorption material.

In certain embodiments, the aperture of the aperture-defining membrane may be punctured prior to sealing the outer enclosure. This can include automated or manual puncturing processes that utilize an instrument to pierce through the membrane of the inner enclosure structure. For example, the membrane may be pierced after the top cover of the outer enclosure is installed by utilizing a test-hole in the cover or base and inserting a sharp instrument. The sharp instrument pierces the membrane allowing for the diffusion and adsorption of the second-type of molecules. In other embodiments, the top cover of the outer enclosure may be outfitted by an extrusion located proximate to the inner enclosure structure within the outer enclosure base. Thus, upon assembling the top cover and base, the extrusion on the top cover punctures the membrane of the inner enclosure structure forming an aperture.

During assembly of a disc drive, according to various embodiments of the present disclosure, an outer enclosure of the disc drive is encompassed with a low-oxygen and/or low-humidity atmospheric environment. In certain embodiments, the aperture of the aperture-defining membrane has been punctured prior to sealing the inner enclosure structure within the outer enclosure. Such an encompassing atmospheric environment during assembly can prevent unwanted adsorption of the high oxygen and/or humidity environment found in cleanrooms where disc drives are usually assembled; otherwise, such adsorption of ambient humidity and oxygen can greatly impact the affective life of the environment-adsorption material and ability to provide environmental protection of the outer enclosure of a disc drive.

In other embodiments, the aperture of the aperture-defining membrane is punctured after sealing the outer enclosure via an automated process within the outer enclosure. In such an embodiment, the aperture is not punctured until a sensor indicative of an atmospheric environment within the outer enclosure determines conditions have exceeded a set threshold. The sensor may include one or more of a plurality of environmental sensors, including but not limited to, an oxygen sensor, a moisture sensor and a temperature sensor. The sensor can be communicatively attached to a controller which would monitor the sensor(s) and puncture the membrane of the inner enclosure structure according to a comparison between the programmed threshold conditions for triggering the puncture and current conditions as reported by the sensor(s).

Turning now to the figures, FIG. 1 shows a partial exploded perspective view illustrating a disc drive apparatus having an inner enclosure structure, consistent with various aspects of the present disclosure. FIG. 1 shows an inner enclosure structure 110 contained within an outer disc drive enclosure 105. The inner enclosure structure 110 also includes a media disc 130 that stores data. The media disc can be written to and read from by an actuator arm 140. Additionally, during reading and writing of the media disc 130, a motor 160 is provided to control the speed at which the media disc 130 is rotated. The inner enclosure structure 110 includes an aperture-defining membrane 120. The aperture-defining membrane 120 is marked 125 to define the location wherein the puncture of the aperture-defining membrane 120 can be made. As an option and consistent with certain specific embodiments discussed above, the aperture-defining membrane 120 can be aligned with an access port 162 of the outer enclosure 105. A puncture tool 166 is then used to pierce the aperture-defining membrane 120 through the aligned access port 162.

Figure 2:
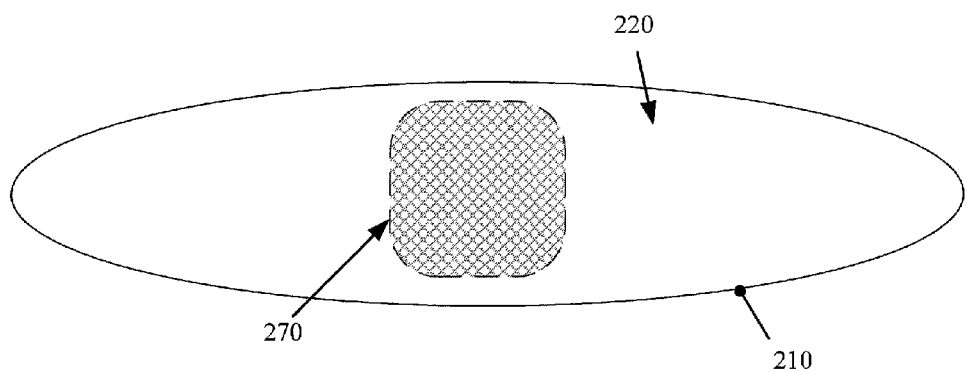
FIG. 2 is a top-down view illustrating an inner enclosure structure according to an exemplary embodiment of the present disclosure, consistent with various aspects of the present disclosure.

FIG. 2 is a cross-sectional view illustrating an inner enclosure structure 210, consistent with various aspects of the present disclosure. As shown in FIG. 2, an aperture-defining membrane 220 is disposed over the entire surface of the inner enclosure structure 210. The inner enclosure structure 210 may be a deformable material, such as a plastic-sealed bag, or a non-deformable material such as a metal-housing. The inner enclosure structure 210 contains a environment-adsorption material 270 along with an inner volume of gas. The membrane 220 may be punctured at a plurality of locations to form an aperture, which facilitates diffusion and adsorption of the second-type of molecules within the inner enclosure structure 210 and environment-adsorption material 270 respectively.

Figure 3:
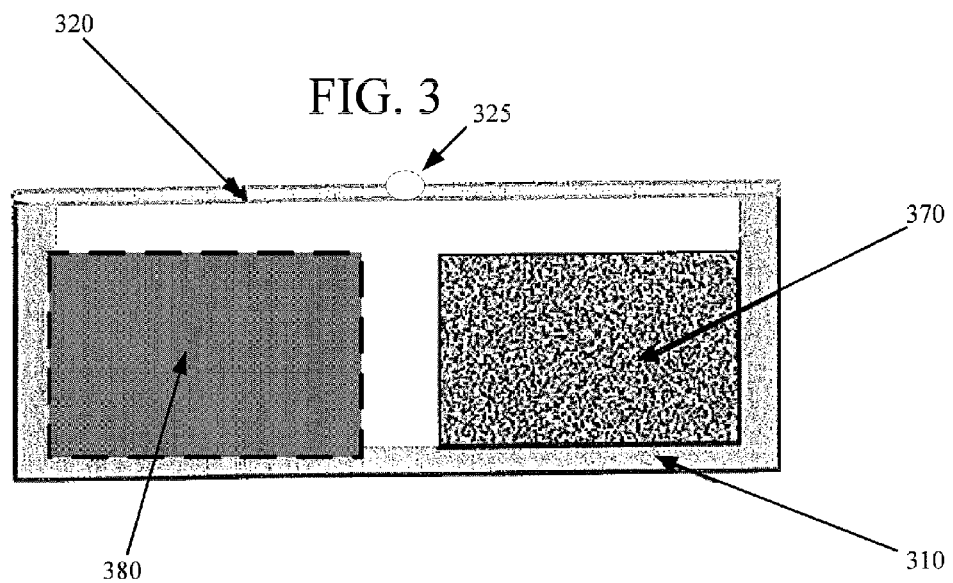
FIG. 3 is a cross-sectional side view illustrating an inner enclosure structure, consistent with various aspects of the present disclosure.

FIG. 3 is a cross-sectional view illustrating an inner enclosure structure 310 consistent with various aspects of the present disclosure. As shown in FIG. 3, the inner enclosure structure 310 contains a first type of environment-adsorption material 370 and a second type of environment-adsorption material 380. An aperture-defining membrane 320 is provided with the inner enclosure structure 310 and includes the first type of environment-adsorption material 370 and the second type of environment-adsorption material 380. The aperture-defining membrane 320 is puncturable, and when punctured as marked at 325, exposes molecules (e.g., oxygen, moisture) external to the inner enclosure structure 310 to adsorption by molecules contained in the first type of environment-adsorption material 370 and the second type of environment-adsorption material 380.

Figure 4:
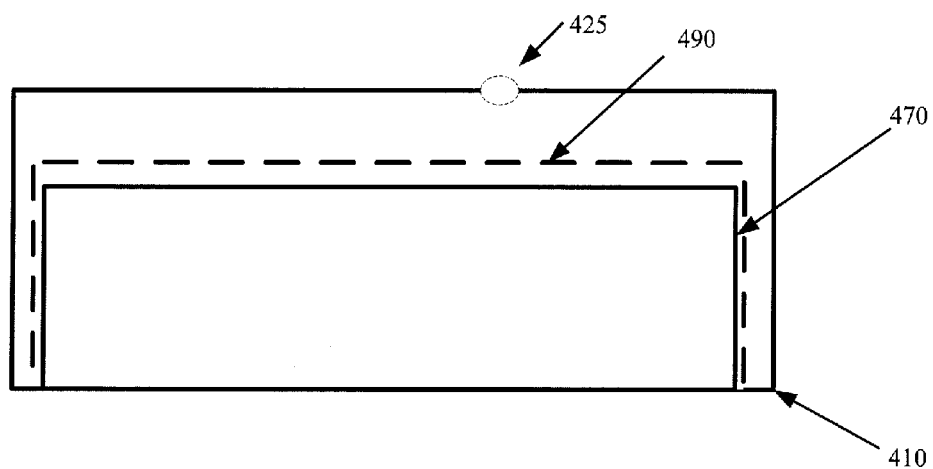
FIG. 4 is a cross-sectional side view illustrating an inner enclosure structure according to an exemplary embodiment of the present disclosure, consistent with various aspects of the present disclosure.

FIG. 4 is a cross-sectional view illustrating an inner enclosure structure 410 and the previously-illustrated aperture-defining membrane 425, consistent with various aspects of the present disclosure. The inner enclosure structure 410 is provided with environment-adsorption material 470 that is encased in PTFE 490 or a similar composition. The PTFE 490 prevents particles of the environment-adsorption material 470 from escaping the inner enclosure structure 410, which can damage the mechanical components outside the inner enclosure structure 410.

Figure 5:
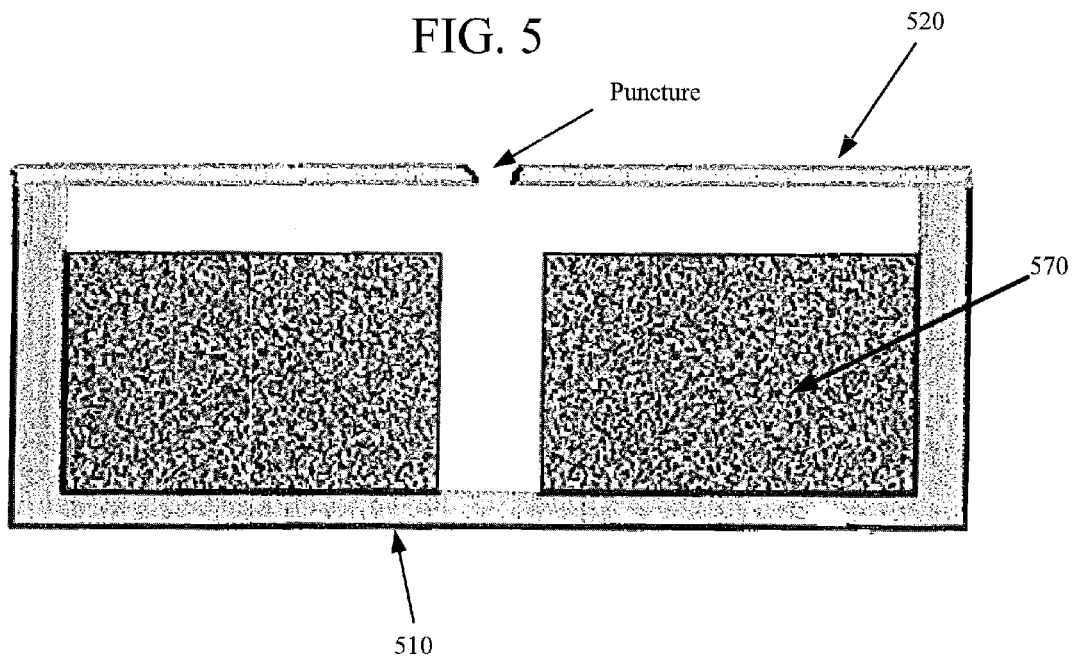
FIG. 5 is a cross-sectional side view illustrating an inner enclosure structure according to an exemplary embodiment of the present disclosure, consistent with various aspects of the present disclosure.

FIG. 5 is a cross-sectional view illustrating an inner enclosure structure 510, consistent with various aspects of the present disclosure. The inner enclosure structure 510 is provided with environment-adsorption material 570. The inner enclosure structure 510 is sealed by an aperture-defining membrane 520. As shown in FIG. 5, the aperture-defining membrane 520 has been punctured, which allows diffusion of molecules into the inner enclosure structure 510 and allows for adsorption into the environment-adsorption material 570.

FIG. 6 shows a cross-sectional view illustrating a plurality of inner enclosure structures 610 within an outer enclosure 605, consistent with various aspects of the present disclosure. The outer enclosure 605 includes a plurality of inner enclosure structures 610, each including an aperture-defining membrane 620 and each being independently puncturable at a marking 625 and/or 625' of the aperture-defining membrane 620. By effecting the punctures at different times of use of the disc drive apparatus, e.g., the second puncture being performed 4-5 years into use, the effective time period in which the plurality of environment-adsorption materials 670 may protect the outer enclosure 605 atmospheric environment from molecules is increased by a factor of about two. Also, by providing an access port 662 above and aligned with the aperture-defining membrane 625, the above-discussed methodology can be used to avoid disassembly for effecting the puncture of the aperture-defining membrane 620.

FIG. 7 is a cross-sectional view illustrating a single inner enclosure structure 710, consistent with various aspects of the present disclosure. As shown in FIG. 7, the single inner enclosure structure 710 contains two or even several independent compartments, including the same type and/or varying environment-adsorption materials 770. In this manner, the single inner enclosure structure 710, having one aperture-defining membrane 720 (with markings 725 and 725') can provide access to the two sets of compartmentalized environment-adsorption materials 770 and 770', and optionally with respectively aligned access ports (not illustrated in FIG. 7). The compartments provide similar advantages to those described in detail above regarding multiple inner enclosure structures. Additionally, the several independent compartments can also include different types of environment-adsorption materials (as discussed above).

Where several independent compartments are used, the time-offset approach discussed above with FIG. 6 can be implemented concurrently with such methodology involving varying types of environment-adsorption materials. By using different types of environment-adsorption materials and reserving some of the compartments for later specific installations of the apparatus, some of the compartments can be reserved to implement the time-offset approach discussed above and the remaining compartments can be initially used to mitigate adverse effects of the different types of molecules (e.g., respectively due to humidity and oxygen).

Specific implementations of the above embodiments use different types of materials and provide for differently-sized and differently-shaped environment-adsorption materials and enclosures, typically with space around the environment-adsorption materials for permitting flow of gas and exposing the environment-adsorption material surfaces. As examples, in certain implementations the membrane can be implemented using a synthetic or aluminum foil, and the inner enclosure may be implemented in various sizes so as to fit in an otherwise unoccupied region of the outer disc drive enclosure as shown in FIG. 1.

Based upon the above discussion and illustrations, those skilled in the art will readily recognize that various modifications and changes may be made without strictly following the exemplary embodiments and applications illustrated and described herein. Furthermore, various features of the different embodiments may be implemented in various combinations. Such modifications do not depart from the true spirit and scope of the present disclosure, including those set forth in the following claims.

What is claimed is:

1. A disc drive apparatus comprising:
   an inner enclosure structure configured and arranged for residing within an outer disc drive enclosure, the inner enclosure structure containing therein
      an environment-adsorption material configured and arranged for combining a first-type of molecules contained within the environment-adsorption material with a second-type of molecules present in the outer disc drive enclosure, and
      an inner volume of gas surrounding the environment-adsorption material with a volumetric pressure less than a volumetric pressure contained in the outer disc drive enclosure; and
   an aperture-defining membrane configured and arranged for covering at least a portion of the inner enclosure structure and for facilitating a diffusion of the second-type of molecules into the inner enclosure structure and into contact with the environment-adsorption material, the environment-adsorption material containing the first-type of molecules for adsorbing the second-type of molecules into the first-type of molecules, therein reducing the volumetric pressure in the outer disc drive enclosure.

2. The apparatus of claim 1, wherein the aperture-defining membrane is marked to identify a region through which an aperture is provided, and the outer enclosure within which the inner enclosure structure is located and within which an ambient gas is contained outside of the inner enclosure structure.

3. The apparatus of claim 1, wherein the aperture-defining membrane is aligned with and configured and arranged to be accessed through an access port of the outer disc drive enclosure, the apparatus further including an electromagnetic disc, a head-actuation assembly, and motor in the outer disc drive enclosure, the head-actuation assembly and the motor being configured and arranged to read and write data on the electromagnetic disc, and wherein the aperture-defining membrane in combination with the environment-adsorption material is further configured and arranged to reduce turbulence and drag related to the head-actuation assembly and the motor, increasing heat-transfer in the disc drive apparatus and facilitating environmental protection of, and lessening impact due to the second-type of molecules on, an electromagnetic disc, the head-actuation assembly and the motor.

4. The apparatus of claim 1, further including an electromagnetic disc, a head-actuation assembly, and motor in the outer disc drive enclosure, the head-actuation assembly and the motor being configured and arranged to read and write data on the electromagnetic disc, and wherein the outer disc drive enclosure is configured and arranged for containing an ambient gas and the inner enclosure structure, the aperture-defining membrane is marked to identify a region through which an aperture is provided, and the aperture-defining membrane in combination with the environment-adsorption material is further configured and arranged to reduce turbulence and drag related to the head-actuation assembly and the motor, increasing heat-transfer in the disc drive apparatus and facilitating environmental protection of, and lessening impact due to the second-type of molecules on, an electromagnetic disc, the head-actuation assembly and the motor.

5. The apparatus of claim 1, wherein the second-type of molecules is selected from the group consisting of oxygen, water, and combinations thereof.

6. The apparatus of claim 1, wherein the aperture-defining membrane is further configured and arranged to facilitate adsorption of the first-type of molecules with the second-type of molecules commensurate with a minimum time period during which the first-type of molecules of the environment-adsorption material interact through dispersion via a puncture through the aperture-defining membrane.

7. The apparatus of claim 1, wherein the inner enclosure structure is configured and arranged with two separate compartments wherein both contain environment-adsorption material and may be punctured independently.

8. The apparatus of claim 1, wherein the membrane is further configured and arranged to function as a tamper-indicator to verify that the membrane is only punctured proximate to ship-date.

9. The apparatus of claim 1, wherein the environment-adsorption material is encased in polytetrafluoroethylene.

10. The apparatus of claim 1, wherein the environment-adsorption material is selected from the group consisting of a desiccant, activated carbon, chemical getters, chemical acid buffers, and combinations thereof.

11. The apparatus of claim 1, wherein the aperture-defining membrane is further configured and arranged to be punctured by a remote automated process post assembly.

12. The apparatus of claim 1, wherein the aperture-defining membrane is further configured and arranged to indicate post-factory service intervals via puncturing of the membrane.

13. The apparatus of claim 1, wherein the aperture-defining membrane is configured and arranged to include a mark on an exterior side of the membrane indicating a location at which to puncture the membrane.

14. A method comprising:
providing an outer disc drive enclosure;
mounting an inner enclosure structure within the outer disc drive enclosure, wherein the inner enclosure structure is configured and arranged to contain an inner volume of gas surrounding an environment-adsorption material with a volumetric pressure less than a volumetric pressure contained in the outer disc drive enclosure;
diffusing a second-type of molecules into the inner enclosure structure and into contact with the environment-adsorption material, containing a first-type of molecules; and
adsorbing the second-type of molecules into the first-type of molecules, thereby reducing the volumetric pressure in the outer disc drive enclosure.

15. The method of claim 14, further including the step of using an aperture-defining membrane to facilitate the adsorption of the second-type of molecules by the first-type of molecules, thereby facilitating protection of an electromagnetic disc, a head-actuation assembly, and a motor from the second-type of molecules present in the outer disc drive enclosure.

16. The method of claim 14, wherein the diffusing and adsorbing steps occur repetitively over a time period defined as a function of an adsorption ability of the environment-adsorption material, and
further including the step of puncturing an aperture of an aperture-defining membrane thereby facilitating the steps of diffusing and adsorbing.

17. The method of claim 14, further including the step of puncturing an aperture of an aperture-defining membrane by utilizing an extrusion on a top cover of the outer disc drive enclosure that punctures the membrane.

18. The method of claim 14, further including the step of encompassing the outer disc drive enclosure with a low-oxygen and low-humidity atmospheric environment, wherein an aperture of an aperture-defining membrane has been punctured prior to sealing the inner enclosure structure within the outer disc drive enclosure.

19. The method of claim 14, further including the step of puncturing an aperture of an aperture-defining membrane via a source external from the outer disc drive enclosure.

20. The method of claim 14, further including the step of puncturing an aperture of an aperture-defining membrane after sealing the outer disc drive enclosure via an automated process within the outer disc drive enclosure, whereby the aperture is not punctured until a sensor indicative of an atmospheric environment within the outer disc drive enclosure determines conditions have exceeded a set threshold.

* * * * *